July 9, 1957  A. H. ELKIND  2,798,635
FLUSH CLAMP ASSEMBLY

Filed July 29, 1954  2 Sheets-Sheet 1

INVENTOR.
ALAN H. ELKIND
BY
*H. S. Mackey*
ATTORNEY.

July 9, 1957

A. H. ELKIND 2,798,635

FLUSH CLAMP ASSEMBLY

Filed July 29, 1954

INVENTOR.
ALAN H. ELKIND

BY

ATTORNEY.

United States Patent Office 2,798,635
Patented July 9, 1957

2,798,635

FLUSH CLAMP ASSEMBLY

Alan H. Elkind, Yonkers, N. Y., assignor to General Precision Laboratory Incorporated, a corporation of New York Application July 29, 1954, Serial No. 446,557

2 Claims. (Cl. 220—55)

This invention relates to clamp fasteners for boxes and particularly to flush fasteners for the cover, side or bottom of a junction box or electrical instrument case. The invention is particularly applicable when quick attachability and detachability are required combined with flush construction as an essential feature. Since flush construction of the mounting surface of a box is generally more useful than flush construction of the other sides, this invention is particularly useful when applied as a mounting clamp assembly.

In aircraft construction, some electrical components of a nature not requiring shock mounting, such as junction boxes, are required to be quickly detachable for servicing and replacement. Generally a mounting plate, tray or bracket is permanently fastened to the aircraft structure and the component secured to the mounting tray by means of wing nut hold-downs. Electrical connections are plugged into the box. In such construction a flush bottom box and tray are advantageous to conserve space. However, the fasteners employed with shock mounted boxes cannot then be employed because they would project below the bottoms of the box and tray. It is necessary to employ more compact fasteners and to sink them into the volume of the box itself. In accomplishing this result the structure is combined with and employs the drain holes required in the bottom of all airborne enclosed instruments and electrical components.

The instant invention provides a mounting and fastening structure which accomplishes these purposes in the generally described manner. It thus achieves compactness and lightness not previously available. The bottom of the box which rests on the tray is usually solid and integral with the box, but alternatively the box may have a separable bottom.

The principal purpose of this invention is to provide a flush clamp for securing the top, bottom or side of a box.

Another purpose of this invention is to provide a positive, quickly attachable and detachable, flush clamp for the mounting surface of a box.

Further understanding of this invention may be secured from the detailed description and drawings, in which.

Figure 1:
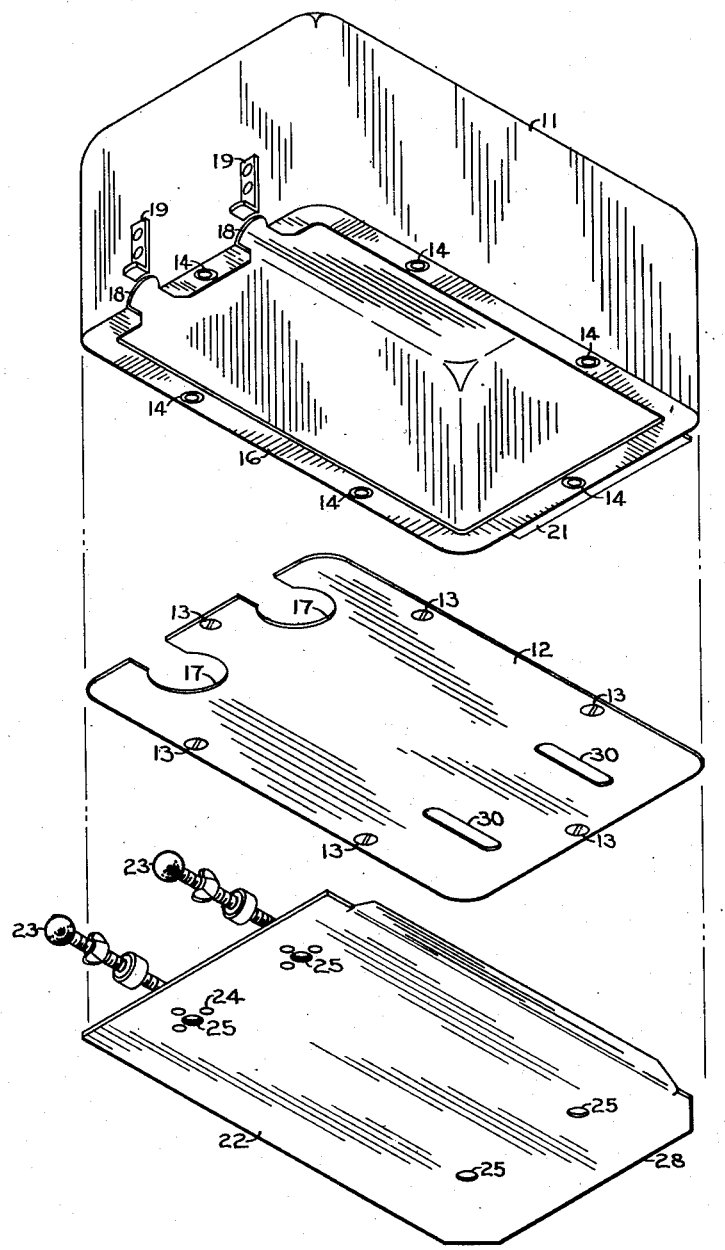
Figure 1 is an exploded isometric view of an electrical junction box with a detachable bottom, and a mounting tray to which the box is secured in a quickly detachable manner by a flush clamp assembly.

Referring now to Fig. 1, a junction box 11 is provided with a detachable bottom plate 12. The bottom plate 12 is provided with six captive quarter-turn fasteners 13 having their slotted heads countersunk flush with the external surface of the plate. Six holes 14 in flanges 16 at the bottom edges of box 11 are equipped with the matching components of fasteners 13. The detachable bottom plate 12 has two apertures 17 near its front edge which serve as box drain holes and also provide clearance for the front hold-down devices. The box 11 is provided with two semicircular cutouts 18 matching in position at the front edge the bottom plate apertures 17. These semicircular cutouts are necessary to provide clearance for the hold-down devices. Two hooks 19 on the front wall of box 11 are part of the two front hold-down devices by which the box is secured to its tray. A flange or lip 21 is riveted to the rear wall of box 11 near its bottom edge to form part of the rear hold-down device.

The mounting tray 22 has two front clamp assemblies 23 riveted by flush rivets 24 to its front edge. These front clamp assemblies together with hooks 19 constitute the front hold-down devices. The rear edge 28 of the tray is bent into a trough having a hook-like cross section to form with flange 21 the rear hold-down device. Four holes 25 are provided for bolting the tray to a shelf or bulkhead, and elongated clearance slots 30 are provided in the bottom plate 12 to clear the rear mounting bolts.

Figure 2:
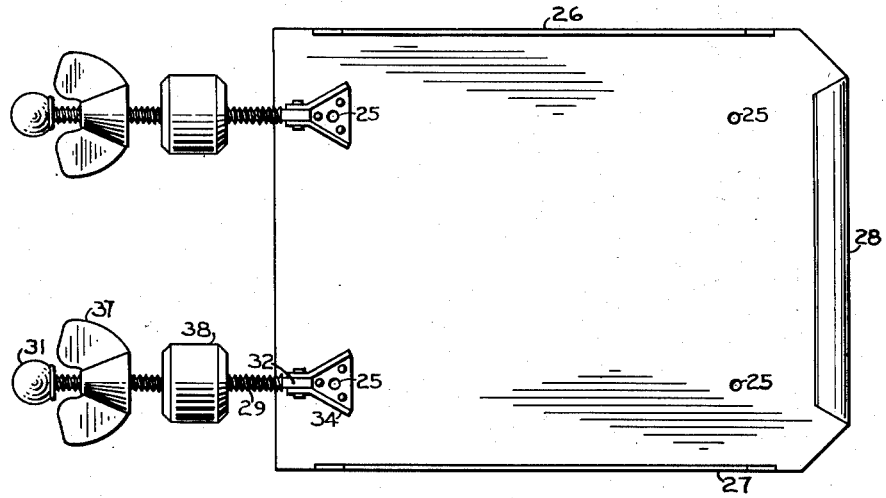
Figure 2 is a plan view of the tray.
Figure 3:
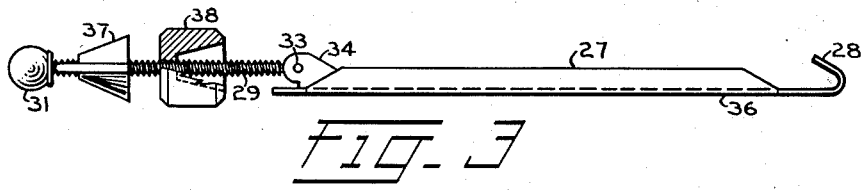
Figure 3 is a side view of the tray.
Figure 4:
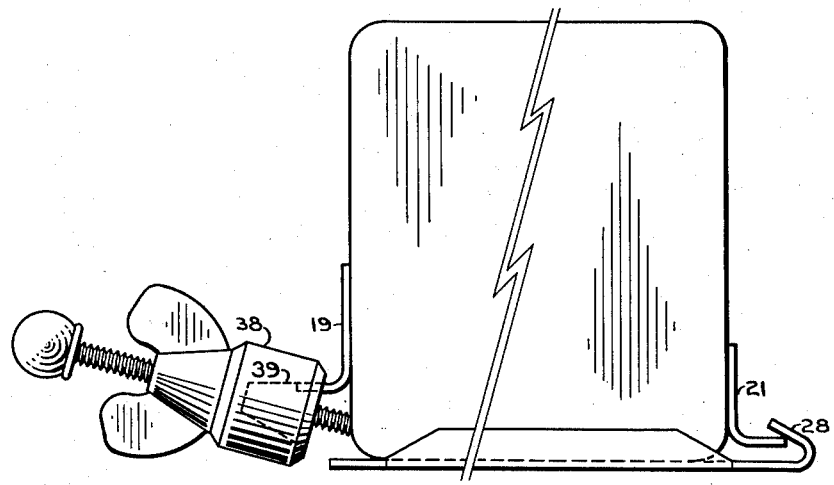
Figure 4 is a side view of the tray and junction box clamped together.

The mounting tray 22 is shown in greater detail in Figs. 2 and 3. Its side edges 26 and 27 are turned up to facilitate securing the box easily and accurately in proper position on the tray preparatory to fastening the box down. The rear edge 28 is turned up in a hook-like form of clamp clearly shown in Fig. 3. The two front clamp assemblies are identical. Each consists of a screw 29 terminated in a ball 31 at one end and an eye 32 at the other. The eye 32 is journalled on a pin 33 riveted to a clevis 34. The clevis is riveted to the tray by flush head rivets so that there are no protrusions beyond the lower surface 36 of the tray 22. The screw 29 is provided with a wing nut 37 and a clamping collar 38 which is loosely fitted on the screw 29. The interior of the clamping collar 38 is recessed to provide a cavity in the form of the frustum of a cone so that when in place the cavity will catch securely on hook 19, Fig. 1. This attitude is clearly indicated in Fig. 4, in which the contact between hook 19 and the conical interior surface 39 of clamping collar 38 is shown. The interaction of rear clamp 28 of the tray with the lip 21 of the box is also shown in Fig. 4.

By such arrangement the mounting clamp or plate presents a smooth flush undersurface devoid of fastening projections or other protuberances.

What is claimed is:

1. A flush clamp assembly comprising, a box member including front and rear faces and having a flange secured to the rear face thereof, a tray including front and rear edges and having its rear edge bent upwardly and inwardly toward the front edge thereof to form a wedging surface engaging said flange, a plurality of clamp assemblies secured to the surface of said tray adjacent the front edge thereof and lying wholly on the side of said tray facing said box member, each of said clamp assemblies being composed of a threaded member pivoted at one end to said tray, a collar member loosely slidable on said threaded member, said collar member being provided with an internal frusto-conical recess, and a nut member in threaded engagement with said threaded member and bearing against said collar member, a plurality of hooks secured to a vertical front face of said box member, each of said hooks being positioned for engagement by a respective one of said clamp assemblies and each of said hooks including a forwardly and upwardly extending leg portion engaged by the surface of a frusto-conical recess of one of said collar members whereby said box is wedged downwardly and rearwardly as respects said tray.

2. A flush clamp assembly comprising, a box member including front and rear faces, a tray member including front and rear edges adapted to be secured to the bottom of said box member, a plurality of clamp assemblies secured to the surface of said tray adjacent the front edge thereof inwardly of the front face of said box and lying wholly on the side of said tray facing said box, a plurality of hooks secured to the front face of said box adjacent the front edge of said tray, each of said hooks being positioned for cooperative engagement by one of said clamp assemblies, said box being provided with apertures on its bottom and front adjacent each of said clamp assemblies to provide clearance therefor while at the same time serving as drainage apertures for the interior of said box, the rear edge of said tray being bent upwardly and inwardly toward the front edge thereof to form a lip engaging portion, and a flange secured to the rear face of said box and positioned for cooperative engagement with said lip engaging portion.

References Cited in the file of this patent

UNITED STATES PATENTS

| | | |
|---|---|---|
| 1,100,647 | Bauman | June 16, 1914 |
| 1,770,066 | Christophel | July 8, 1930 |
| 2,296,053 | Porter et al. | Sept. 15, 1942 |
| 2,630,996 | Lauther | Mar. 10, 1953 |
| 2,631,800 | Pinkston | Mar. 17, 1953 |